(12) United States Patent
Yoshizawa et al.

(10) Patent No.: US 12,206,934 B2
(45) Date of Patent: *Jan. 21, 2025

(54) MOBILE INFORMATION TERMINAL

(71) Applicant: Maxell, Ltd., Kyoto (JP)

(72) Inventors: Kazuhiko Yoshizawa, Ibaraki (JP);
Nobuo Masuoka, Ibaraki (JP);
Motoyuki Suzuki, Ibaraki (JP)

(73) Assignee: Maxell, Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/432,335

(22) Filed: Feb. 5, 2024

(65) Prior Publication Data

US 2024/0179370 A1    May 30, 2024

Related U.S. Application Data

(63) Continuation of application No. 18/135,390, filed on Apr. 17, 2023, now Pat. No. 11,930,245, which is a
(Continued)

(51) Int. Cl.
*H04N 21/439* (2011.01)
*H04N 21/414* (2011.01)
(Continued)

(52) U.S. Cl.
CPC ... *H04N 21/4394* (2013.01); *H04N 21/41407* (2013.01); *H04N 21/4227* (2013.01);
(Continued)

(58) Field of Classification Search
CPC ......... H04N 21/4394; H04N 21/41407; H04N 21/4227; H04N 21/438; H04N 21/442; H04N 21/482
See application file for complete search history.

(56) References Cited

U.S. PATENT DOCUMENTS

| 5,739,793 A | 4/1998 | Aachi |
| 5,786,776 A | 7/1998 | Kisaichi |

(Continued)

FOREIGN PATENT DOCUMENTS

| CN | 1574956 A | 2/2005 |
| CN | 103248756 A | 8/2013 |

(Continued)

OTHER PUBLICATIONS

International Search Report of PCT/JP2014/072190 dated Nov. 24, 2014.

(Continued)

*Primary Examiner* — Nicholas T Corbo
(74) *Attorney, Agent, or Firm* — Mattingly & Malur, PC

(57) ABSTRACT

Provided is a mobile information terminal that performs data transmission and reception, the data transmission and reception including video data reception. The mobile information terminal includes a communication management execution module that obtains a communication amount of data transmitted and received by the mobile information terminal in a predetermined period, and a remote viewing execution module that compares the obtained communication amount to a preset predetermined value and makes an image quality of the video data selectable according to a relationship between the obtained communication amount and the predetermined value.

13 Claims, 9 Drawing Sheets

Related U.S. Application Data continuation of application No. 17/462,540, filed on Aug. 31, 2021, now Pat. No. 11,665,390, which is a continuation of application No. 15/328,594, filed as application No. PCT/JP2014/072190 on Aug. 25, 2014, now Pat. No. 11,140,438.

(51) Int. Cl.
  *H04N 21/4227* (2011.01)
  *H04N 21/438* (2011.01)
  *H04N 21/442* (2011.01)
  *H04N 21/482* (2011.01)

(52) U.S. Cl.
  CPC ......... *H04N 21/438* (2013.01); *H04N 21/442* (2013.01); *H04N 21/4821* (2013.01)

(56) References Cited

U.S. PATENT DOCUMENTS

| | | |
|---|---|---|
| 9,232,174 B1 | 1/2016 | Kotab |
| 9,641,411 B1 | 5/2017 | Rogan |
| 9,727,873 B1 | 8/2017 | Wood |
| 2002/0118806 A1 | 8/2002 | Walker |
| 2004/0093403 A1 | 5/2004 | Toyama |
| 2005/0030369 A1 | 2/2005 | Ryu |
| 2005/0046390 A1 | 3/2005 | Kimura |
| 2007/0037523 A1 | 2/2007 | Bi |
| 2007/0054624 A1 | 3/2007 | Kashiwagi |
| 2008/0162670 A1 | 7/2008 | Chapweske |
| 2008/0320540 A1 | 12/2008 | Brooks |
| 2009/0010662 A1 | 1/2009 | Naoi |
| 2009/0023482 A1 | 1/2009 | Koura |
| 2009/0031384 A1 | 1/2009 | Brooks |
| 2009/0141792 A1 | 6/2009 | Mori |
| 2009/0190582 A1 | 7/2009 | Nambiath |
| 2009/0207866 A1 | 8/2009 | Cholas |
| 2010/0150245 A1 | 6/2010 | Camp, Jr. |
| 2010/0248643 A1 | 9/2010 | Aaron |
| 2011/0126248 A1 | 5/2011 | Fisher |
| 2011/0302248 A1 | 12/2011 | Garrett |
| 2011/0307935 A1 | 12/2011 | Kotecha |
| 2012/0005368 A1 | 1/2012 | Knittle |
| 2012/0084232 A1 | 4/2012 | Kurabayashi et al. |
| 2012/0180101 A1 | 7/2012 | Davis |
| 2012/0192234 A1 | 7/2012 | Britt |
| 2012/0259950 A1 | 10/2012 | Havekes |
| 2013/0088958 A1 | 4/2013 | Wakui et al. |
| 2013/0235035 A1 | 9/2013 | Nara |
| 2013/0268961 A1 | 10/2013 | Miles |
| 2014/0020037 A1 | 1/2014 | Hybertson |
| 2014/0130099 A1 | 5/2014 | Kunisetty |
| 2014/0160997 A1 | 6/2014 | Rhee |
| 2014/0204756 A1 | 7/2014 | Higashino et al. |
| 2014/0267098 A1 | 9/2014 | Na |
| 2015/0244751 A1 | 8/2015 | Lee |

FOREIGN PATENT DOCUMENTS

| | | |
|---|---|---|
| JP | 2007-081950 A | 3/2007 |
| JP | 2007-129472 A | 5/2007 |
| JP | 2008-085574 A | 4/2008 |
| JP | 2012-138705 A | 7/2012 |
| JP | 2013-058994 A | 3/2013 |
| JP | 2013-211632 A | 10/2013 |
| WO | 2012/046286 A1 | 4/2012 |

OTHER PUBLICATIONS

Japanese Office Action received in corresponding Japanese Application No. 2018-005435 dated Oct. 9, 2018.
Chinese Office Action received in corresponding Chinese Application No. 201480081478.X dated Jan. 11, 2019.

|   | ELAPSED DAYS | FIRST PREDETERMINED VALUE | SECOND PREDETERMINED VALUE |
|---|---|---|---|
| (a) | 1st TO 10th | 3.0GByte | 5.0GByte |
| (b) | 11th TO 20th | 4.0GByte | 5.5GByte |
| (c) | 21st OR LATER | 5.0GByte | 6.0GByte |

FIG. 7A

| CUMULATIVE AMOUNT OF DATA COMMUNICATION | | DISPLAY FORMAT |
|---|---|---|
| (a) | LESS THAN OR EQUAL TO FIRST PREDETERMINED VALUE | ○ 720p<br>○ 360p<br>○ 180p |
| (b) | LESS THAN OR EQUAL TO SECOND PREDETERMINED VALUE | ○ 360p<br>○ 180p |
| (c) | MORE THAN SECOND PREDETERMINED VALUE | ○ 180p |

FIG. 7B

| CUMULATIVE AMOUNT OF DATA COMMUNICATION | | INITIAL SELECTION VALUE |
|---|---|---|
| (a) | LESS THAN OR EQUAL TO FIRST PREDETERMINED VALUE | ◉ 720p<br>○ 360p<br>○ 180p |
| (b) | LESS THAN OR EQUAL TO SECOND PREDETERMINED VALUE | ○ 720p<br>◉ 360p<br>○ 180p |
| (c) | MORE THAN SECOND PREDETERMINED VALUE | ○ 720p<br>○ 360p<br>◉ 180p |

FIG. 8

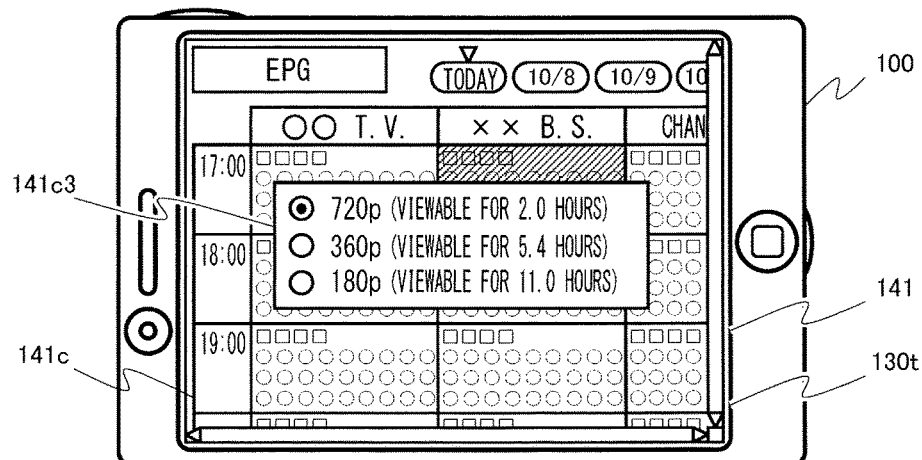

MOBILE INFORMATION TERMINAL

TECHNICAL FIELD

The present invention relates to a mobile information terminal.

BACKGROUND ART

A mobile information terminal such as a mobile phone, a smartphone, or a tablet terminal is generally used for content viewing. For example, with the use of a content distribution service, it is possible for a user to view, for example, video content (moving image, still image) or audio content downloaded or streaming from a server on a network to a mobile information terminal. Particularly, contents such as moving images have become significantly larger in size in recent years as the resolution of the contents becomes higher.

However, the following Patent Literature 1 describes that "to become smartphone users, most of such users tend to subscribe to flat-rate communication charge plans (generally called "Pake-hodai"). These plans allow users to view web sites or video sites without worrying about the cost, thereby accelerating the increase in data communication amount. On the other hand, a large difference in data communication amount arises among users, and, in reality, a significant amount of use by some heavy users pushes up the entire communication amount. Thus, flat-rate charges are increased for facility enhancement, which will result in unfairness among users. Accordingly, some of the carriers have begun to take measures for reducing the entire data communication amount by limiting a bandwidth used by each of the users who have performed communication of extremely large amount of data."

CITATION LIST

Patent Literature

Patent Literature 1: Japanese Unexamined Patent Application Publication No. 2013-058994A

SUMMARY OF INVENTION

Technical Problem

In fact, some of the mobile phone carriers in Japan impose limitations on communication speed for the purposes of, for example, preventing their lines from being occupied by some heavy users. The purpose of such limitations on communication speed is to force a data communication speed to be a lower speed when the total data communication amount through mobile phone network communication in a communication system such as wideband code division multiple access (W-CDMA) (registered trademark) or long term evolution (LTE) in a predetermined period exceeds a predetermined value. For example, once the total data communication amount in a month exceeds 7.0 GB, the subsequent data communication speed is limited to less than or equal to 128 kbps within the month. That is, it can be said that the data capacity within which high-speed data communication is possible is predetermined for each predetermined period in mobile phone network communication systems of the mobile phone carriers.

Thus, a user uses the above-described content distribution service to, for example, download large moving-image content or view such content in the form of streaming data at the early time of the predetermined period and uses up the data communication capacity within which high-speed data communication is possible, the subsequent use of the service may become inconvenient for the user. Therefore, when the content distribution service that requires communication of large amount of data is used, it is desirable to perform communication control or the like that takes the data communication amount into consideration. The Patent Literature 1 describes a technique that imposes a limitation on data communication amount, but it does not describe communication control based on a data communication amount.

An object of the present invention is to provide a mobile information terminal that provides high usability when content viewing is performed.

Solution to Problem

The techniques described in the claims are used as means for solving the problem described above.

Examples of the techniques used herein include a mobile information terminal that performs data transmission and reception, the data transmission and reception including video data reception. The mobile information terminal includes a communication management execution module that obtains a communication amount of data transmitted and received by the mobile information terminal in a predetermined period, and a remote viewing execution module that compares the obtained communication amount to a preset predetermined value and makes an image quality of the video data selectable according to a relationship between the obtained communication amount and the predetermined value.

Advantageous Effects of Invention

Employing the present invention makes it possible to provide a mobile information terminal that provides high usability when content viewing is performed.

BRIEF DESCRIPTION OF DRAWINGS

FIG. 7A is a diagram illustrating an example of a display format of a remote image quality selection box that imposes a limitation on the selection thereof.

FIG. 7B is a diagram illustrating an example of a display format of the remote image quality selection box that does not impose a limitation on the selection thereof.

FIG. 8 is a diagram illustrating a display example of a remote image quality selection screen of the mobile information terminal including viewable times.

DESCRIPTION OF EMBODIMENT

Figure 1:
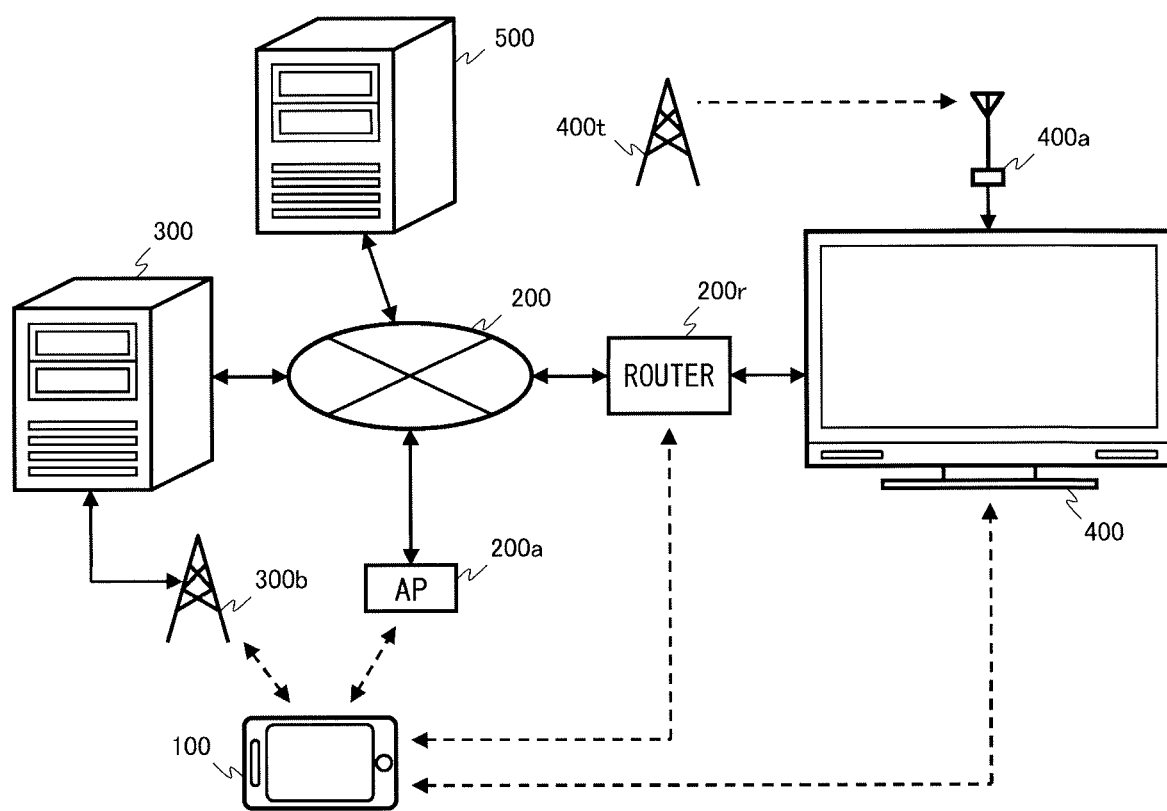
FIG. 1 is a diagram illustrating an example of a system configuration of a communication system.

Examples of an embodiment of the present invention will be described below with reference to the drawings.
System Configuration FIG. 1 is a system configuration diagram illustrating an example of a communication system including a mobile information terminal of the present example. The communication system of the present example includes a mobile information terminal 100, a broadband network 200 such as the Internet, an access point 200a, a router 200r, a mobile phone communication server 300, a base station 300b of a mobile phone communication network, a broadcast receiver 400, an antenna 400a, a broadcasting tower 400t of a broadcasting station, and an additional application server 500.

The mobile information terminal 100 has telephone communication (phone call) and data transmission and reception capabilities via a mobile phone network, and a wireless communication capability using, for example, Wi-Fi (registered trademark). The mobile information terminal 100 is capable of connecting to the Internet 200 via the outdoor access point 200a or via the base station 300b and mobile phone communication server 300 of the mobile phone communication network. In addition, the mobile information terminal 100 is capable of communicating with each server on the Internet 200 for data transmission and reception. Additionally, the mobile information terminal 100 has a capability to play back, for example, video content (moving image, still image) or audio content obtained from each server on the Internet 200.

The mobile information terminal 100 may be, for example, a mobile phone, a smartphone, or a tablet terminal. The mobile information terminal 100 may also be, for example, a personal digital assistant (PDA), a laptop personal computer (PC), or an electronic book reader. Furthermore, the mobile information terminal 100 may be, for example, a digital still camera, a video camera capable of capturing videos, a mobile game console, a navigation device, or any other mobile digital device.

The access point 200a is connected with the Internet 200 through wired communication and connected with the mobile information terminal 100 through wireless communication such as Wi-Fi. This configuration allows the mobile information terminal 100 and each server on the Internet 200 to mutually transmit and receive data via the access point 200a.

The mobile phone communication server 300 is connected with the Internet 200 and connected with the mobile information terminal 100 via the base station 300b. The mobile phone communication server 300 manages telephone communication (phone call) and data transmission and reception, via the mobile phone communication network, of the mobile information terminal 100 and allows data transmission and reception through the communication between the mobile information terminal 100 and each server on the Internet 200. The mobile information terminal 100 and the base station 300b may communicate with each other in the W-CDMA system, LTE system, or any other communication system.

The broadcast receiver 400 is a television receiver that receives and displays a digital broadcast wave transmitted from the broadcasting tower 400t of the broadcasting station via the antenna 400a. The broadcast receiver 400 may be, for example, an optical disc drive recorder such as a digital versatile disc (DVD) recorder, a magnetic disk drive recorder such as a hard disc drive (HDD) recorder, or a set top box (STB). The broadcast receiver 400 may also be, for example, a PC, a tablet terminal, or a game console that is capable of receiving a digital broadcast.

Note that the broadcast receiver 400 is capable of connecting with the Internet 200 via the in-house router 200r and is capable of communicating with each server on the Internet 200 for data transmission and reception.

The router 200r is connected with the Internet 200 through wired communication and is connected with the broadcast receiver 400 through wireless communication or wired communication. Furthermore, the router 200r may be connected with the mobile information terminal 100 through wireless communication such as Wi-Fi. This configuration allows each server on the Internet 200, the broadcast receiver 400, and the mobile information terminal 100 to mutually transmit and receive data via the router 200r. Note that the broadcast receiver 400 and the mobile information terminal 100 may communicate directly, namely, not via the router 200r, with each other in a system such as BlueTooth (registered trademark) or near field communication (NFC).

Figure 2A:
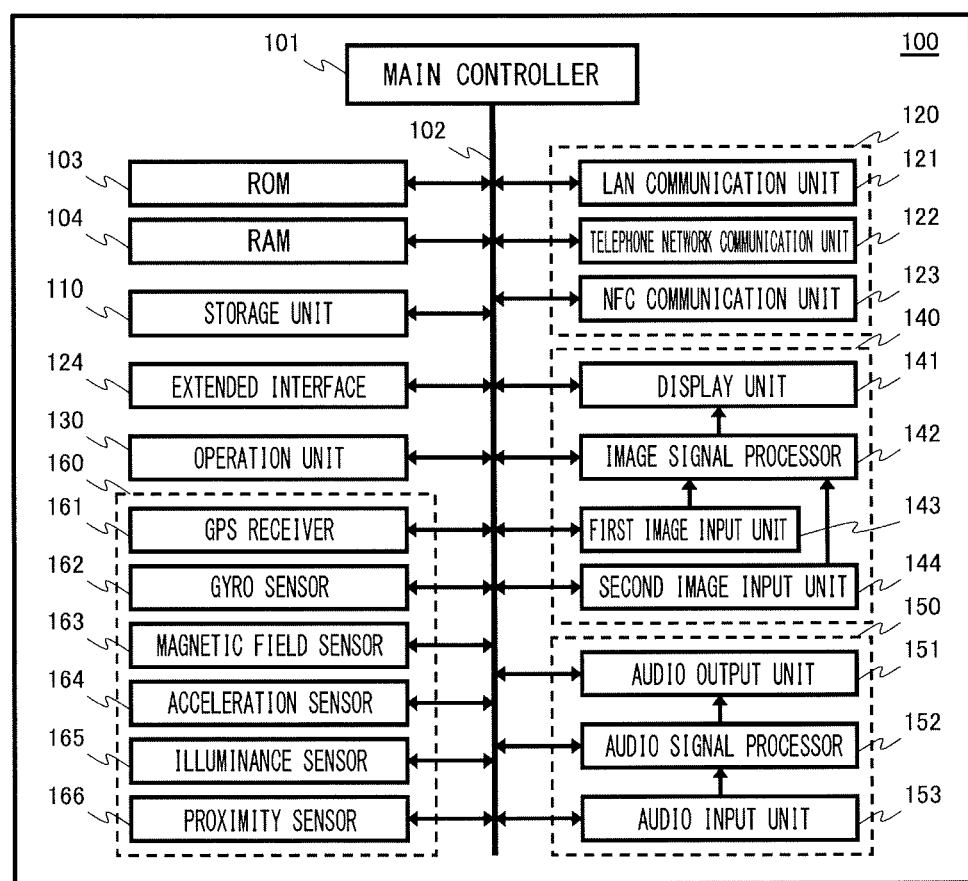
FIG. 2A is a diagram illustrating an example of a block configuration of a mobile information terminal.

The additional application server 500 is a known server that performs, for example, storage, management, and distribution of general applications, operation programs, and various contents and data. There may be more than one additional application server 500 on the Internet 200.
Hardware Configuration of Mobile Information Terminal FIG. 2A is a block diagram illustrating an example of the internal configuration of the mobile information terminal 100. The mobile information terminal 100 includes a main controller 101, a system bus 102, a ROM 103, a RAM 104, a storage unit 110, a communication processor 120, an extended interface 124, an operation unit 130, an image processor 140, an audio processor 150, and a sensor 160.

The main controller 101 is a microprocessor unit that controls the entire mobile information terminal 100. The system bus 102 is a data communication channel for data transmission and reception between the main controller 101 and each operating block in the mobile information terminal 100.

The read only memory (ROM) 103 is a memory in which a basic operation program, such as an operating system, and other operation programs are stored. For example, a rewritable ROM such as an electrically erasable programmable ROM (EEPROM) or a flash ROM is used. The random access memory (RAM) 104 serves as a work area during the execution of the basic operation program or other operation programs. The ROM 103 and the RAM 104 may be integrated with the main controller 101. Furthermore, the ROM 103 may be constituted of some storage area in the storage unit 110 rather than an independent element as illustrated in FIG. 2A.

The storage unit 110 stores, for example, operation programs and operation setting values of the mobile information terminal 100, and personal information on the user of the mobile information terminal 100. In addition, an operation program downloaded from a network, various data created by the operation program, and the like can be stored in the storage unit 110. Furthermore, content such as a moving image, still image, and audio downloaded from a network can be stored in the storage unit 110.

Some area in the storage unit 110 may constitute part or all of the ROM 103. Furthermore, it is required that the storage unit 110 retain the stored information even with no power supplied from outside to the mobile information terminal 100. Therefore, for example, a semiconductor memory such as a flash ROM or a solid state drive (SSD), or a magnetic disk drive such as an HDD is used.

Note that the operation programs stored in the ROM 103 or the storage unit 110 may be updated or functionally extended through downloading from each server on the Internet 200.

The communication processor 120 includes a local area network (LAN) communication unit 121, a mobile phone network communication unit 122, and an NFC communication unit 123. The LAN communication unit 121 is connected with the Internet 200 via the outdoor access point 200*a* or the in-house router 200*r* and performs data transmission and reception with each server on the Internet 200. The LAN communication unit 121 is connected with the access point 200*a* or the router 200*r* through wireless connection such as Wi-Fi. The mobile phone network communication unit 122 performs telephone communication (phone call) and data transmission and reception through wireless communication with the base station 300*b* of the mobile phone communication network. The mobile phone network communication unit 122 is connected with the base station 300*b* in a communication system such the W-CDMA system or the LTE system. The NFC communication unit 123 performs wireless communication, with the NFC communication unit 123 in close proximity to a corresponding reader/writer. The LAN communication unit 121, the mobile phone network communication unit 122, and the NFC communication unit 123 are each provided with a coding circuit, a decoding circuit, an antenna, and the like. Furthermore, the communication processor 120 may be provided with an additional communication unit such as a BlueTooth communication unit or an infrared communication unit.

The extended interface 124 is a group of interfaces for extending the capabilities of the mobile information terminal 100. The extended interface 124 includes, for example, a video/audio interface, a universal serial bus (USB) interface, and a memory interface in the present example. The video/audio interface receives a video signal/audio signal from an external video/audio output device, outputs a video signal/audio signal to the external video/audio input device, and the like. The USB interface is connected with, for example, a PC to perform data transmission and reception therewith. The USB interface may also be connected with a keyboard or any other USB device. The memory interface is connected with a memory card or any other memory medium to perform data transmission and reception therewith.

Figure 5A:
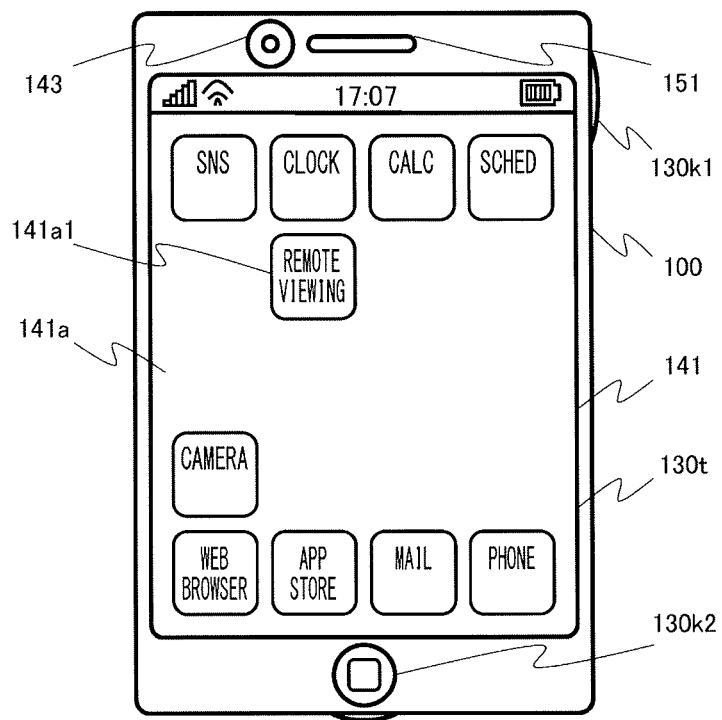
FIG. 5A is a diagram illustrating a display example of a basic screen of the mobile information terminal.

The operation unit 130 is an instruction-input unit for a user to input an operation instruction to the mobile information terminal 100. In the present example as illustrated in FIG. 5A, the operation unit 130 includes a touch panel 130*t* disposed on a display unit 141 so as to cover the display unit 141, and operation keys 130*k* that are button switches arranged. The operation unit 130 may include only one of the touch panel 130*t* and the operation keys 130*k*. The mobile information terminal 100 may be operated through, for example, a keyboard connected to the extended interface 124. The mobile information terminal 100 may be operated through a separate mobile terminal device connected through wired communication or wireless communication. Furthermore, the display unit 141 may be provided with the touch panel function.

The image processor 140 includes the display unit 141, an image signal processor 142, a first image input unit 143, and a second image input unit 144. The display unit 141 is, for example, a display device such as a liquid crystal panel and provides image data processed by the image signal processor 142 to the user of the mobile information terminal 100. The image signal processor 142 is provided with a video RAM (not illustrated) and drives the display unit 141 on the basis of the image data input to the video RAM. The image signal processor 142 has a capability to perform, for example, format conversion, and superimposition of a menu or other on-screen display (OSD) signals as needed. The first image input unit 143 and the second image input unit 144 are camera units for converting light incident through a lens to an electrical signal by using an electronic device such as a charge coupled device (CCD) or complementary metal oxide semiconductor (CMOS) sensor to obtain image data of surroundings or an object.

The audio processor 150 includes an audio output unit 151, an audio signal processor 152, and an audio input unit 153. The audio output unit 151 is a speaker that provides an audio signal processed by the audio signal processor 152 to the user of the mobile information terminal 100. The audio input unit 153 is a microphone that converts, for example, a user's voice to audio data and inputs the audio data.

The sensor 160 is a group of sensors for detecting states of the mobile information terminal 100. The sensor 160 includes, in the present example, a global positioning system (GPS) receiver 161, a gyrosensor 162, a magnetic field sensor 163, an acceleration sensor 164, an illuminance sensor 165, and a proximity sensor 166. The group of sensors makes it possible to detect, for example, a position, inclination, orientation, motion, ambient brightness, and proximity to surrounding objects of the mobile information terminal 100. The mobile information terminal 100 may further be provided with another sensor such as an atmospheric pressure sensor.

Note that although the configuration example of the mobile information terminal 100 illustrated in FIG. 2A includes many components that are not required for the present example, such as the sensor 160, a configuration even without these components does not impair the effect of the present example. Other components (not illustrated) such as a digital broadcast reception function or an electronic money settlement function may be added.

Software Configuration of Mobile Information Terminal

Figure 2B:
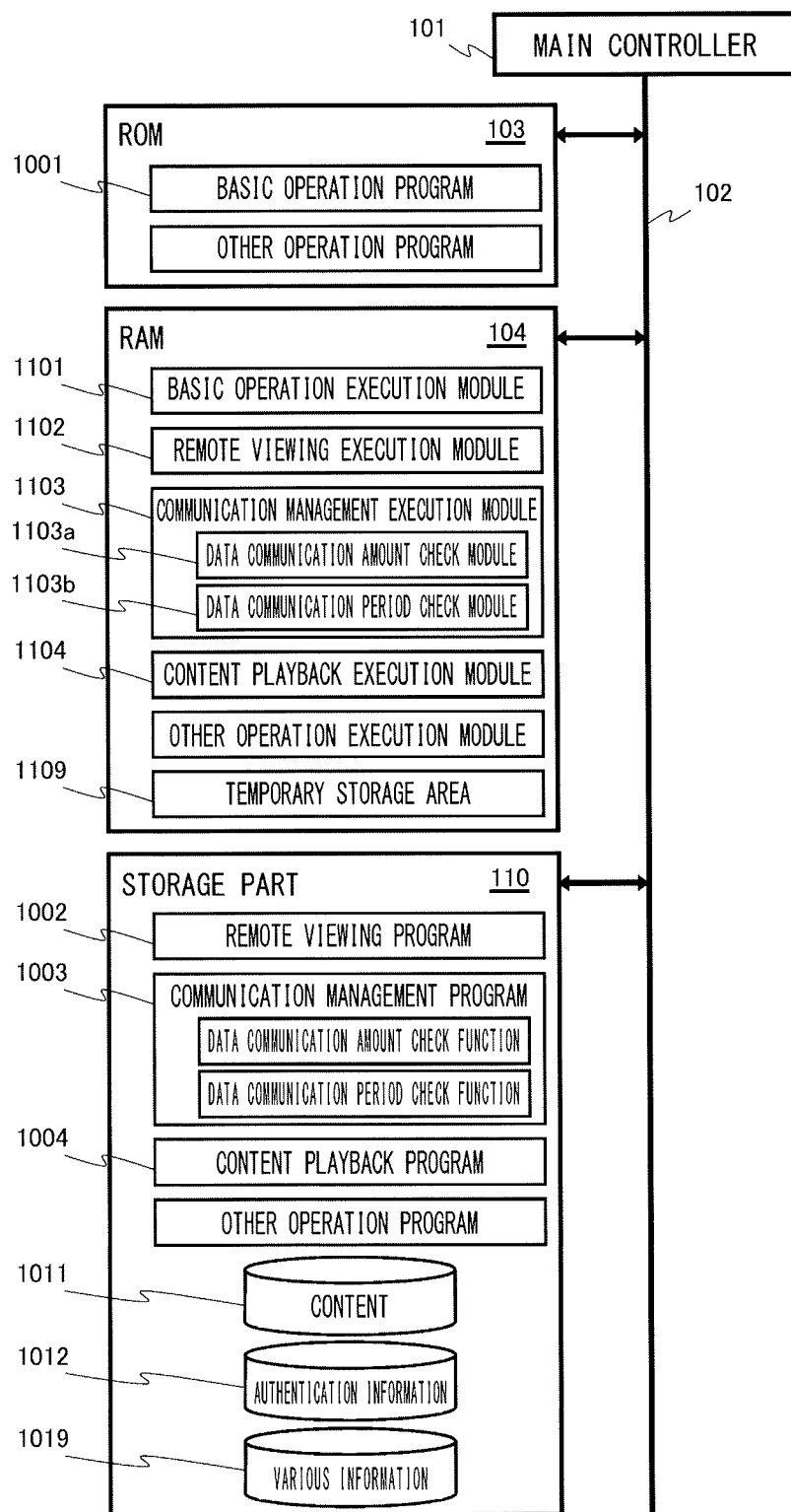
FIG. 2B is a diagram illustrating an example of a software configuration of the mobile information terminal.

FIG. 2B is a software configuration diagram of the mobile information terminal 100 of the present example. FIG. 2B illustrates an example of software configurations in the ROM 103, the RAM 104, and the storage unit 110. In the present example, a basic operation program 1001 and other operation programs are stored in the ROM 103, and a remote viewing program 1002, a communication management program 1003, a content playback program 1004, and other operation programs are stored in the storage unit 110. Furthermore, the storage unit 110 includes a content storage area 1011 for storing content such as a moving image, still image, and audio, an authentication information storage area 1012 for storing authentication information used for collaborative operation with an external device, and a various information storage area 1019 for storing other various information.

The basic operation program 1001 stored in the ROM 103 is loaded in the RAM 104, and then the main controller 101 executes the loaded basic operation program to configure a basic operation execution module 1101. Note that, for illustrating this state, the basic operation execution module 1101 is depicted inside the RAM 104 in FIG. 2B. The other modules inside the RAM 104, which will be described below, are depicted in the same way. The remote viewing program 1002, the communication management program 1003, and the content playback program 1004 stored in the storage unit 110 are loaded in the RAM 104, and then the main controller 101 executes the loaded operation programs to configure respective modules, namely, a remote viewing execution module 1102, a communication management execution module 1103, and a content playback execution module 1104. The RAM 104 includes a temporary storage area 1109 for temporarily retaining, for example, data generated during the execution of each operation program as needed.

For ease of explanation, a process in which the main controller 101 loads, in the RAM 104, the basic operation program 1001 stored in the ROM 103 and executes the loaded program to control each operating block will be described below as a process in which the basic operation execution module 1101 controls each operating block. Other operation programs will be described in a similar manner. The detail of each operation execution module will be described later.

Each of the operation programs may be pre-stored in the ROM 103 and/or the storage unit 110 before product shipment. The program may be obtained from, for example, the additional application server 500 on the Internet 200 via the LAN communication unit 121 or the mobile phone network communication unit 122 after product shipment. Each of the operation programs stored in, for example, a memory card or optical disc may be obtained via the extended interface 124 or the like.

Hardware Configuration of Broadcast Receiver

Figure 3:
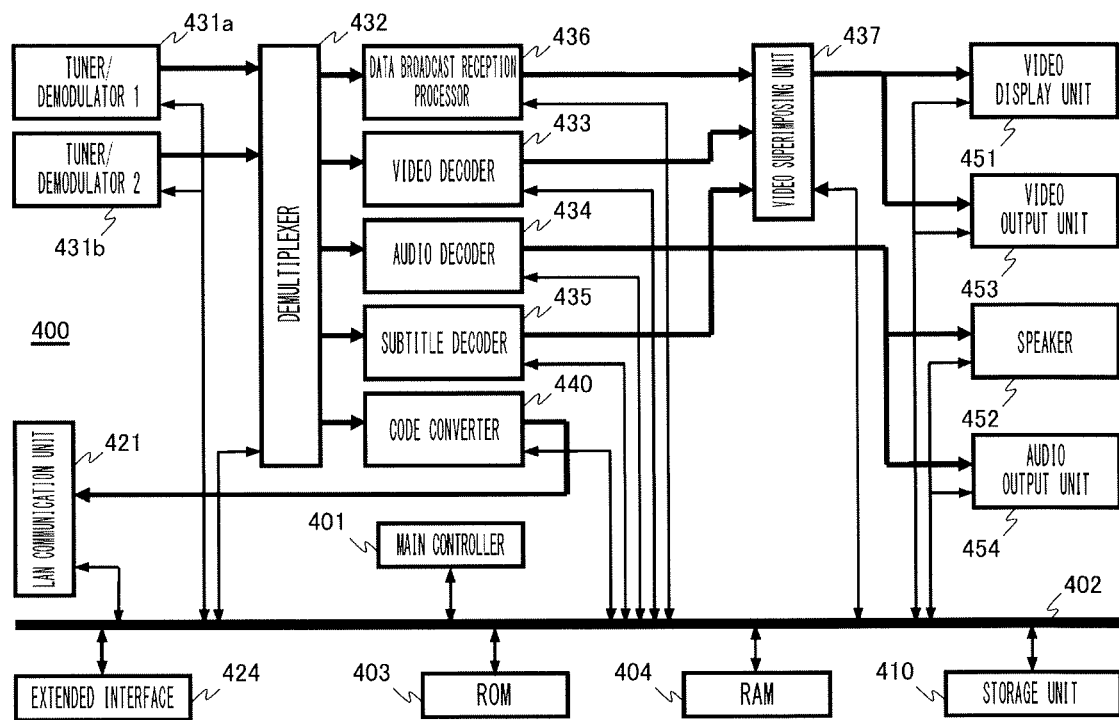
FIG. 3 is a diagram illustrating an example of a block configuration of a broadcast receiver.

FIG. 3 is a block diagram illustrating an example of the internal configuration of the broadcast receiver 400. The broadcast receiver 400 includes a main controller 401, a system bus 402, a ROM 403, a RAM 404, a storage unit 410, a LAN communication unit 421, an extended interface 424, a tuner/demodulator 431, a demultiplexer 432, a video decoder 433, an audio decoder 434, a subtitle decoder 435, a data broadcast reception processor 436, a video superimposing unit 437, a code converter 440, a video display unit 451, a speaker 452, a video output unit 453, and an audio output unit 454.

The main controller 401 is a microprocessor unit that controls the entire broadcast receiver 400 according to a predetermined operation program. The system bus 402 is a data communication channel for data transmission and reception between the main controller 401 and each operating block in the broadcast receiver 400.

The ROM 403 is a memory in which a basic operation program, such as an operating system, and other operation programs are stored. For example, a rewritable ROM such as an EEPROM or a flash ROM is used. The RAM 404 serves as a work area during the execution of the basic operation program or other operation programs.

The storage unit 410 stores, for example, operation programs and operation setting values of the broadcast receiver 400, and personal information on the user of the broadcast receiver 400. In addition, an operation program downloaded from a network, various data created by the operation program, and the like can be stored in the storage unit 410. Furthermore, content such as a moving image, still image, and audio obtained from a broadcast wave or downloaded from a network can be stored in the storage unit 410. Some area in the storage unit 410 may constitute part or all of the ROM 403.

The LAN communication unit 421 is connected with the Internet 200 via the in-house router 200r and performs data transmission and reception with each server on the Internet 200. The connection with the router 200r may be a wired connection or may be a wireless connection such as Wi-Fi. The LAN communication unit 421 is provided with a coding circuit, a decoding circuit, and the like. Furthermore, the broadcast receiver 400 may be provided with an additional communication unit such as a BlueTooth communication unit, an NFC communication unit, or an infrared communication unit.

The tuner/demodulator 431a and tuner/demodulator 431b receive a digital broadcast wave from the broadcasting tower 400t via the antenna 400a and tune in to (select) a channel for a service desired by the user under the control of the main controller 401. Furthermore, the tuner/demodulator 431a and tuner/demodulator 431b demodulate a broadcast signal in the received digital broadcast wave to obtain a transport stream (TS). Note that the example illustrated in FIG. 3 includes two tuner/demodulators. The tuner/demodulator 431a and tuner/demodulator 431b can be controlled independently. In the following, the tuner/demodulator 431a and tuner/demodulator 431b are not distinguished from each other and referred to as a tuner/demodulator 431.

The demultiplexer 432 receives the TS output from the tuner/demodulator 431 and demultiplexes the TS into data rows such as a video data row, an audio data row, a subtitle data row, a program information data row, and a broadcast markup language (BML) data row. These data rows may be, for example, in the form of an elementary stream (ES). The video decoder 433 decodes the video data row input from the demultiplexer 432 and outputs video information. The audio decoder 434 decodes the audio data row input from the demultiplexer 432 and outputs audio information. The subtitle decoder 435 decodes the subtitle data row input from the demultiplexer 432 and outputs subtitle information. The data broadcast reception processor 436 decodes the BML data row input from the demultiplexer 432 to regenerate a BML document and executes the BML document to output data broadcast screen information.

The video superimposing unit 437 receives the video information output from the video decoder 433, the subtitle information output from the subtitle decoder 435, and the data broadcast screen information output from the data broadcast reception processor 436 and performs a process such as selection and/or superimposition. The video superimposing unit 437 is provided with a video RAM (not illustrated), and the video display unit 451 and the like are driven on the basis of the video information input in the video RAM. Furthermore, the video superimposing unit 437 performs, for example, a scaling process, and a superimposing process, as needed, on electronic program guide (EPG) screen information created on the basis of the program information data row output from the demultiplexer 432 under the control of the main controller 401.

The code converter 440 performs a transcoding process on the TS output from the tuner/demodulator 431, the ES output from the demultiplexer 432, recorded content obtained from the storage unit 110, or the like to convert, for example, a resolution, a bit rate, or a coding system.

The video display unit 451 is, for example, a display device such as a liquid crystal panel that provides, to the user of the broadcast receiver 400, the video information subjected to the selection process and/or superimposing process by the video superimposing unit 437. The speaker 452 provides the audio information output from the audio decoder 434 to the user of the broadcast receiver 400. The video output unit 453 is a video output interface that outputs the video information subjected to the selection process and/or superimposing process by the video superimposing unit 437. The audio output unit 454 is an audio output interface that outputs the audio information output from the audio decoder 434.

Note that the video output unit 453 and audio output unit 454 are not essential components of the present example in a case where the broadcast receiver 400 is, for example, a television receiver. The video display unit 451 and speaker 452 are not essential components of the present example in a case where the broadcast receiver 400 is, for example, a DVD recorder.

The extended interface 424 is a group of interfaces for extending the capabilities of the broadcast receiver 400. The extended interface 424 includes, for example, a video/audio interface, a USB interface, and a memory interface in the present example. The video/audio interface receives a video signal/audio signal from an external video/audio output device, outputs a video signal/audio signal to the external video/audio input device, and the like. The USB interface is connected with, for example, a PC to perform data transmission and reception therewith. An HDD may be connected to the USB interface to record a broadcast program or downloaded content. The USB interface may also be connected with a keyboard or any other USB device. The memory interface is connected with a memory card or any other memory medium to perform data transmission and reception therewith.

Operation Sequence of Mobile Information Terminal

An operation of the mobile information terminal 100 of the present example will be described below.

Note that a description is given of a case where the mobile information terminal 100 and the broadcast receiver 400 of the present example are provided with a remote viewing function that makes a digital broadcast program or recorded content thereof viewable with, for example, a smartphone or a tablet terminal located away from home via the Internet 200, such a digital broadcast program being received by, for example, an in-house television receiver or a DVD recorder.

Furthermore, in the present example, the data transmission and reception between the mobile information terminal 100 and the Internet 200 is performed by the mobile phone network communication unit 122 via the mobile phone communication server 300 and the base station 300b. This includes a case where data transmission and reception using the LAN communication unit 121 is impossible due to, for example, no access point 200a being located near the mobile information terminal 100. Furthermore, the data communication function provided by the mobile phone carrier for the mobile information terminal 100 of the present example has a capability to impose a limitation on communication speed.

Figure 4:
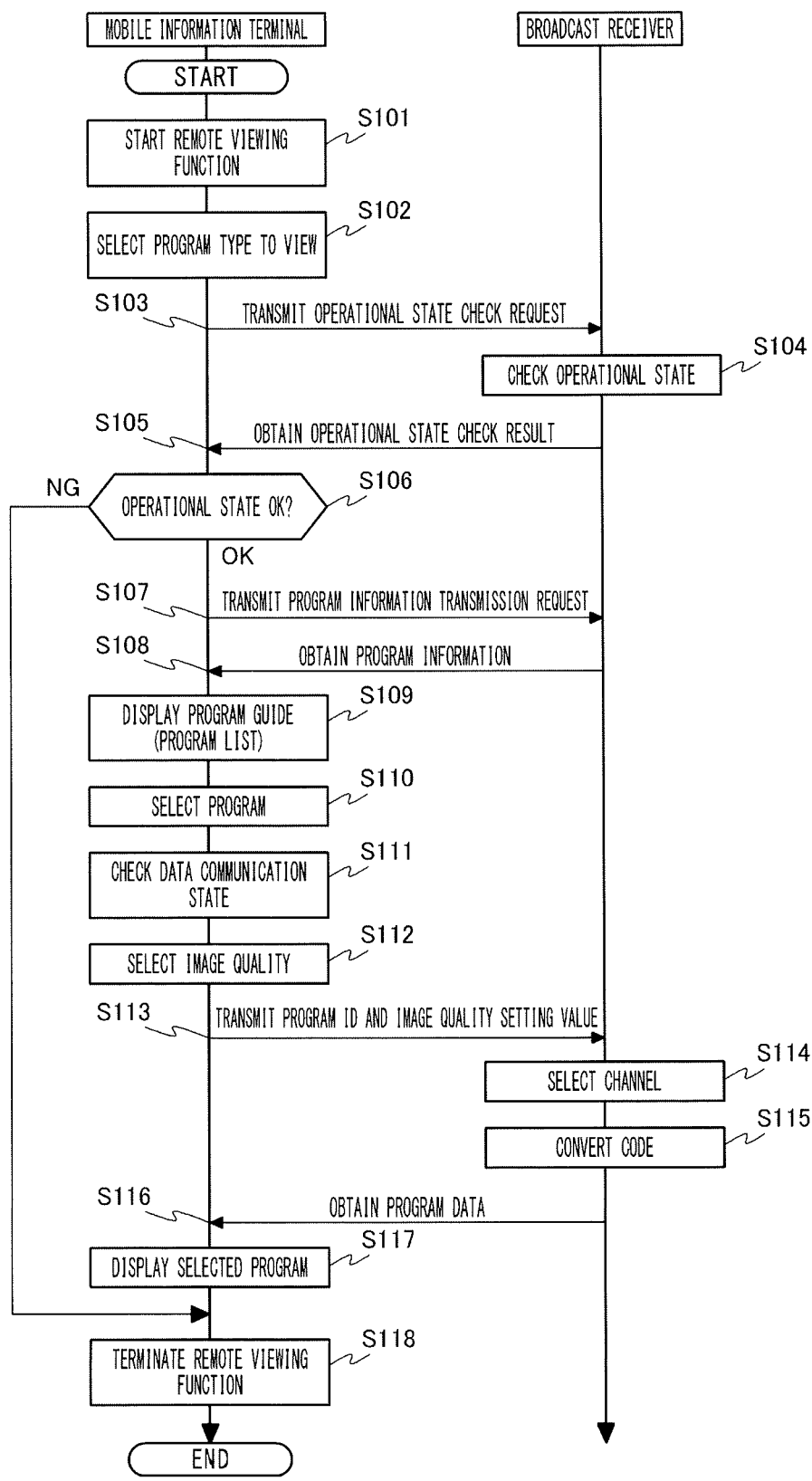
FIG. 4 is a diagram illustrating an example of an operation sequence performed during the execution of a remote viewing function of the mobile information terminal.

FIG. 4 is an operation sequence diagram illustrating an example of operations performed during the execution of the remote viewing function of the mobile information terminal 100. FIGS. 5A to 5E are screen display diagrams illustrating each operation screen displayed on the display unit 141 of the mobile information terminal 100 during the execution of the remote viewing function.

FIG. 5A is a screen display diagram illustrating an example of a basic screen 141a displayed on the display unit 141 of the mobile information terminal 100. The basic screen 141a is displayed upon the power to the mobile information terminal 100 being turned on by pressing a power key 130k1 or upon a home key 130k2 being pressed during the execution of any application program. In the basic screen 141a, icons associated with each application program executable by the mobile information terminal 100 are displayed on the display unit 141. Selection of any one of the icons causes a predetermined application program associated with the selected icon to be executed.

Note that the icon may be selected through, for example, a tap operation on a predetermined area on the touch panel 130t that corresponds to a position on the display unit 141 at which the target icon is displayed. Alternatively, the icon may be selected with an operation key (not illustrated), such as a cross cursor key or an enter key. The icon may be selected on the basis of line-of-sight information obtained by the first image input unit 143 that detects the line-of-sight of the user of the mobile information terminal 100.

In the mobile information terminal 100 that operates under the control of the basic operation execution module 1101, selection of an icon 141a1 on the basic screen 141a through a user's operation such as a tap operation causes the basic operation execution module 1101 to invoke the remote viewing execution module 1102 and transfer main control to the remote viewing execution module 1102. The transfer of the main control may be performed by, for example, an invocation of a program subroutine, and the basic operation execution module 1101 may operate in the background after the transfer of the main control. Note that the icon 141a1 is an icon associated with an application program that executes the remote viewing function on the mobile information terminal 100 of the present example.

An example of operations performed during the execution of the remote viewing function of the mobile information terminal 100 under the control of the remote viewing execution module 1102 will be described below with reference to the operation sequence in FIG. 4.

The selection of the icon 141a1 on the basic screen 141a through a user's operation such as a tap operation starts the remote viewing function of the mobile information terminal 100 (S101). Next, the remote viewing execution module 1102 to which the main control has been transferred from the basic operation execution module 1101 by the invocation of the remote viewing function displays a program type selection screen 141b on the display unit 141.

Figure 5B:
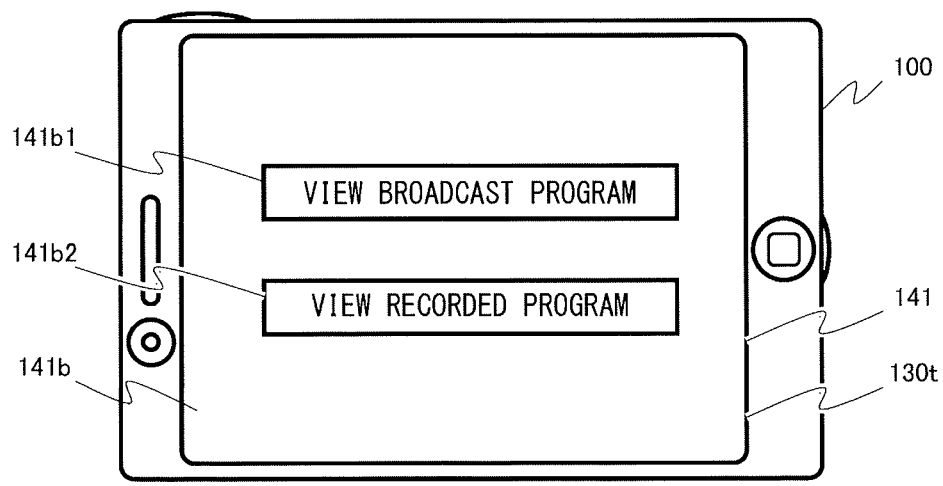
FIG. 5B is a diagram illustrating a display example of a program type selection screen of the mobile information terminal.

FIG. 5B is a screen display diagram illustrating an example of the program type selection screen 141b displayed on the display unit 141 of the mobile information terminal 100. With the remote viewing function of the mobile information terminal 100 of the present example, it is possible to perform live viewing of a digital broadcast program received by the tuner/demodulator 431 of the broadcast receiver 400 and viewing of recorded content stored in the storage unit 410 by the broadcast receiver 400. The program type selection screen 141b displays a selection icon 141b1 for performing the live viewing of a digital broadcast program and a selection icon 141b2 for performing the viewing of recorded content. In the following, a case where the live viewing of a digital broadcast program is performed will be described.

Selection of the icon 141b1 on the program type selection screen 141b through a user's operation such as a tap operation (S102) causes the remote viewing execution module 1102 to first transmit, to the broadcast receiver 400 with which the mobile information terminal 100 is paired in advance, an operational state check request for checking an operational state of the broadcast receiver 400 (S103). The pairing may be performed as appropriate through an authentication process in advance between the mobile information terminal 100 and the broadcast receiver 400 via a network constructed by the router 200r in a house in which the broadcast receiver 400 is installed. The mobile information terminal 100 stores the result of the authentication process in an authentication information storage area 1012 of the storage unit 110. Note that the authentication process may be performed by any known technique.

The broadcast receiver 400 that has received the operational state check request from the mobile information terminal 100 checks an operational state of each component in the broadcast receiver 400 (S104). That is, the broadcast receiver 400 checks the operational state of each of the hardware and software components to determine whether or not the remote viewing function is ready to be executed on the mobile information terminal 100. The broadcast receiver 400 returns the result of the operational state check to the mobile information terminal 100.

The remote viewing execution module 1102 of the mobile information terminal 100 obtains the result of the operational state check from the broadcast receiver 400 (S105). The remote viewing execution module 1102 then refers to the obtained operational state of the broadcast receiver 400 to determine whether or not the remote viewing function is ready to be executed (S106). When the broadcast receiver 400 is in use by another in-house user and particularly, for example, the function of the tuner 431 or the code converter 440 is not available, the remote viewing execution module 1102 determines that the remote viewing function is not ready to be executed. In S105, when, for example, the result of the operational state check cannot be obtained from the broadcast receiver 400, the remote viewing execution module 1102 may also determine that the remote viewing function is not ready to be executed. When determining that the remote viewing function is not ready to be executed in S106 (S106: NG), the remote viewing execution module 1102 returns the main control to the basic operation execution module 1101 and terminates its operation (S118).

In contrast, when determining that the remote viewing function is ready to be executed in S106 (S106: OK), the remote viewing execution module 1102 then transmits a program information transmission request to the broadcast receiver 400 (S107). The broadcast receiver 400 that has received the program information transmission request from the mobile information terminal 100 returns the program information data row output from the demultiplexer 432 to the mobile information terminal 100 as program information. Upon obtaining the program information returned from the broadcast receiver 400 in response to the program information transmission request (S108), the remote viewing execution module 1102 of the mobile information terminal 100 displays a program guide screen 141c created on the basis of the obtained program information on the display unit 141 (S109).

Figure 5C:
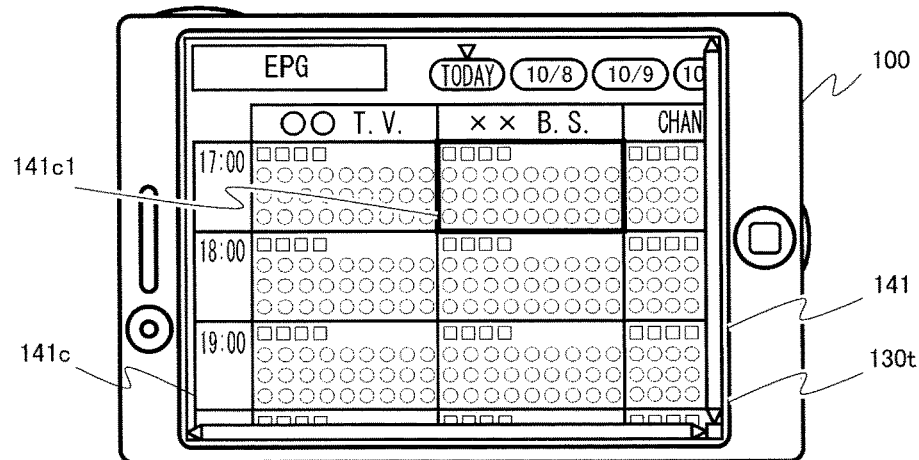
FIG. 5C is a diagram illustrating a display example of a program guide screen of the mobile information terminal.

FIG. 5C is a screen display diagram illustrating an example of the program guide screen 141c displayed on the display unit 141 of the mobile information terminal 100. The program guide screen 141c is a table showing broadcast programs to be distributed in a digital broadcast service. The table is created by the remote viewing execution module 1102 on the basis of the program information obtained from the broadcast receiver 400. In the present example, the program guide screen 141c shows detailed information on each broadcast program that is broadcast in each time slot on each channel, the information being arranged in a matrix in which the vertical axis represents time and the horizontal axis represents service ID (channel).

The program guide screen 141c may only show detailed information on broadcast programs that are currently being broadcast on respective channels. Furthermore, the program guide screen 141c may be displayed in such a way that only the broadcast programs that are currently being broadcast can be selected. Moreover, as an alternative to S107 and S108, the remote viewing execution module 1102 of the mobile information terminal 100 may obtain the program information directly from a program information distribution server (not illustrated) on the Internet 200 via the mobile phone network communication unit 122.

Next, a process of selecting a broadcast program that the user wishes to view is performed by using the remote viewing function (S110). The process of selecting a broadcast program that the user wishes to view may be performed, on the program guide screen 141c displayed on the display unit 141 in S109, by detecting a tap operation on a predetermined area on the touch panel 130t corresponding to an area in which detailed information on the broadcast program that the user wishes to view is displayed (an area 141cl in the example illustrated in FIG. 5C) or the like.

After the process of selecting a broadcast program is performed in response to an operation by the user of the mobile information terminal 100, the communication management execution module 1103 performs a process of checking a data communication state of the mobile information terminal 100 under the control of the remote viewing execution module 1102 (S111). For example, in the process of checking a data communication state, a data communication amount check module 1103a of the communication management execution module 1103 performs a process of checking the total data communication amount of the mobile information terminal 100 through mobile phone network communication in a predetermined period. Furthermore, according to the result of the process of checking a data communication state, the remote viewing execution module 1102 displays, on the program guide screen 141c, a remote image quality selection box 141c2 for prompting the user to select a viewing image quality of the broadcast program during remote viewing.

Figure 5D:
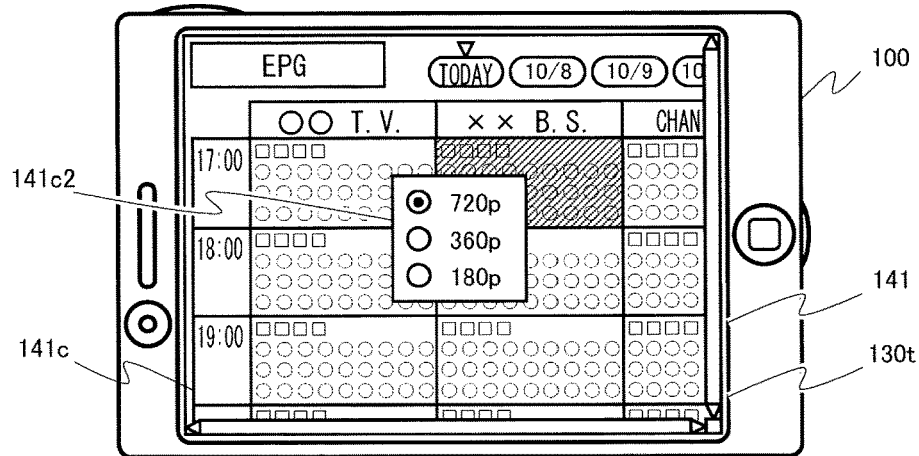
FIG. 5D is a diagram illustrating a display example of a remote image quality selection screen of the mobile information terminal.

FIG. 5D is a screen display diagram illustrating an example of the remote image quality selection box 141c2 displayed on the program guide screen 141c. For the mobile information terminal 100 of the present example, a viewing image quality during remote viewing can be selected from three types of viewing image qualities, namely, 720p, 360p, and 180p. In this configuration, three types of setting values, 720p, 360p, and 180p, are displayed in the remote image quality selection box 141c2 in such a way that the setting values are appropriately selectable.

The details of the above-described processes of checking the total data communication amount through mobile phone network communication in a predetermined period and displaying the remote image quality selection box 141c2 on the program guide screen 141c on the basis of the check result will be described later.

After the process of selecting a viewing image quality during remote viewing is performed in response to an operation by the user of the mobile information terminal 100

(S112), the remote viewing execution module 1102 then transmits, to the broadcast receiver 400, program identification information with which the broadcast program selected in S110 can be identified and the setting value of the viewing image quality selected in S112 (S113).

After receiving the program identification information and the setting value of the viewing image quality from the mobile information terminal 100, the broadcast receiver 400 controls the tuner/demodulator 431 on the basis of the received program identification information to select a channel for the broadcast program specified in the program identification information (S114). Furthermore, the broadcast receiver 400 inputs a TS of the broadcast program output from the tuner/demodulator 431 to the code converter 440 via the demultiplexer 432, and the code converter 440 performs a transcoding process that corresponds to the setting value of the received viewing image quality (S115). That is, when the user of the mobile information terminal 100 selects 360p as a viewing image quality during remote viewing in S112, the code converter 440 transcodes 1080i video data of digital broadcast into the selected 360p video data, for example. The broadcast program data output from the code converter 440 is distributed to the mobile information terminal 100 via the LAN communication unit 421.

The remote viewing execution module 1102 of the mobile information terminal 100 obtains the broadcast program data distributed from the broadcast receiver 400 in response to the transmission of the program identification information and the setting value of the viewing image quality (S116). Furthermore, the content playback execution module 1104 performs, as appropriate, necessary processes such as decoding the obtained broadcast program data under the control of the remote viewing execution module 1102 and displays the broadcast program data as a remote viewing screen 141*d* on the display unit 141 via the image signal processor 142 (S117).

Figure 5E:
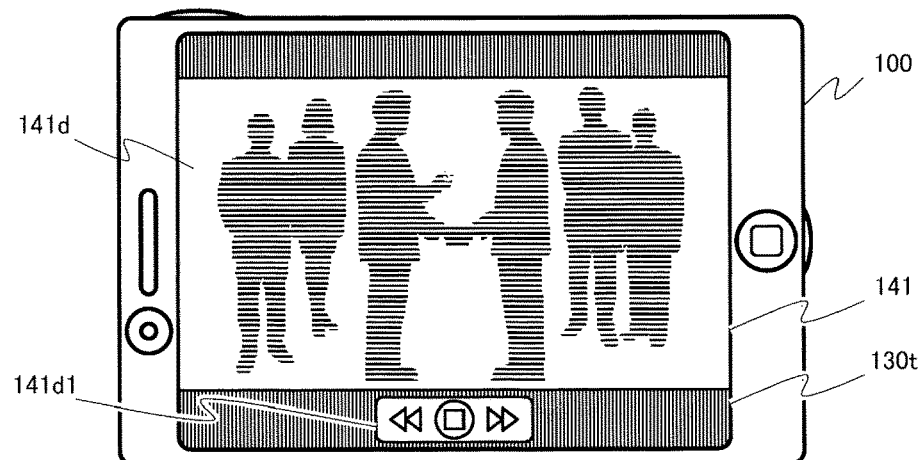
FIG. 5E is a diagram illustrating a display example of a remote viewing screen of the mobile information terminal.

FIG. 5E is a screen display diagram illustrating an example of the remote viewing screen 141*d* displayed on the display unit 141 of the mobile information terminal 100. The remote viewing screen 141*d* is a viewing screen when live viewing of a digital broadcast program, which has been received by the in-house broadcast receiver 400, is performed away from home on the mobile information terminal 100 via the Internet 200. A control icon 141*d*1 is an icon for an operation such as terminating remote viewing or changing a channel.

When the remote viewing is stopped by a user's operation on the control icon 141*dl* or when the broadcast program being viewed ends and the remote viewing stops automatically, the remote viewing execution module 1102 returns the main control to the basic operation execution module 1101 and terminates its operation (S118). Note that the remote viewing execution module 1102 may continue its operation without termination thereof and display the program type selection screen 141*b* on the display unit 141 to prompt the user to select to perform the live viewing of a digital broadcast program again or the viewing of recorded content. This configuration only requires the operation to make a transition to S102 of the operation sequence in FIG. 4. Alternatively, the remote viewing execution module 1102 may display the program guide screen 141*c* on the display unit 141 and prompt the user to select a broadcast program again. This configuration only requires the operation to make a transition to S107 of the operation sequence in FIG. 4.

When the user selects, in S102, to perform the viewing of recorded content stored in the storage unit 410 of the broadcast receiver 400, it is only required that a transmission request for recorded content list information be transmitted to the broadcast receiver 400 in S107. Furthermore, in S108 and S109, it is only required that the recorded content list information transmitted from the broadcast receiver 400 be obtained and a recorded content list be created from the obtained recorded content list information and displayed on the display unit 141. Moreover, in S114, it is only required that a process of reading predetermined recorded content from the storage unit 410 be performed on the basis of identification information on the recorded content transmitted from the mobile information terminal 100.

Next, the processes of S111 and S112 will be described in detail.

Note that, with the limitation on communication speed imposed by the mobile phone carrier for the mobile information terminal 100 of the present example, the data communication speed is not limited (that is, for example, high-speed data communication of 75 Mbps is possible) while the total data communication amount in a month is less than or equal to 7.0 GB, and the data communication speed is limited to a lower speed (for example, less than or equal to 128 kbps) once the total data communication amount in the month exceeds 7.0 GB. Furthermore, on the mobile information terminal 100 of the present example, a viewing image quality during remote viewing (hereinafter referred to as a "remote viewing image quality") can be selected from three types of remote viewing image qualities, 720p, 360p, and 180p as described above. Respective communication bands required for the remote viewing image qualities are about 4.0 Mbps, about 1.5 Mbps, and about 700 kbps.

These remote viewing image qualities may be used as viewing image qualities that can be transcoded by the code converter 440 of the broadcast receiver 400 and viewing image qualities which the mobile information terminal 100 supports. For example, the mobile information terminal 100 may obtain information relating to viewing image qualities that can be transcoded by the broadcast receiver 400 in S105 and compare these viewing image qualities with viewing image qualities that can be displayed by the mobile information terminal 100. The mobile information terminal 100 may obtain communication band information from the broadcast receiver 400 in S105 because the value of the communication band corresponding to each remote viewing image quality depends on what is converted by the code converter 440.

Selection of the 720p as a remote viewing image quality requires data transfer of about 1.47 GB to receive one-hour video data. That is, when the user selects the 720p as a remote viewing image quality, video data reception through high-speed data communication can be performed for only about 4.7 hours. When the user selects the 360p as a remote viewing image quality, to receive one-hour video data requires a data communication amount of about 0.55 GB, and the video data reception through high speed data communication can be performed for about 12.7 hours. When the user selects the 180p as a remote viewing image quality, to receive one-hour video data requires a data communication amount of about 0.27 GB, and the video data reception through high speed data communication can be performed for about 25.9 hours.

Figures 6A, 6B:
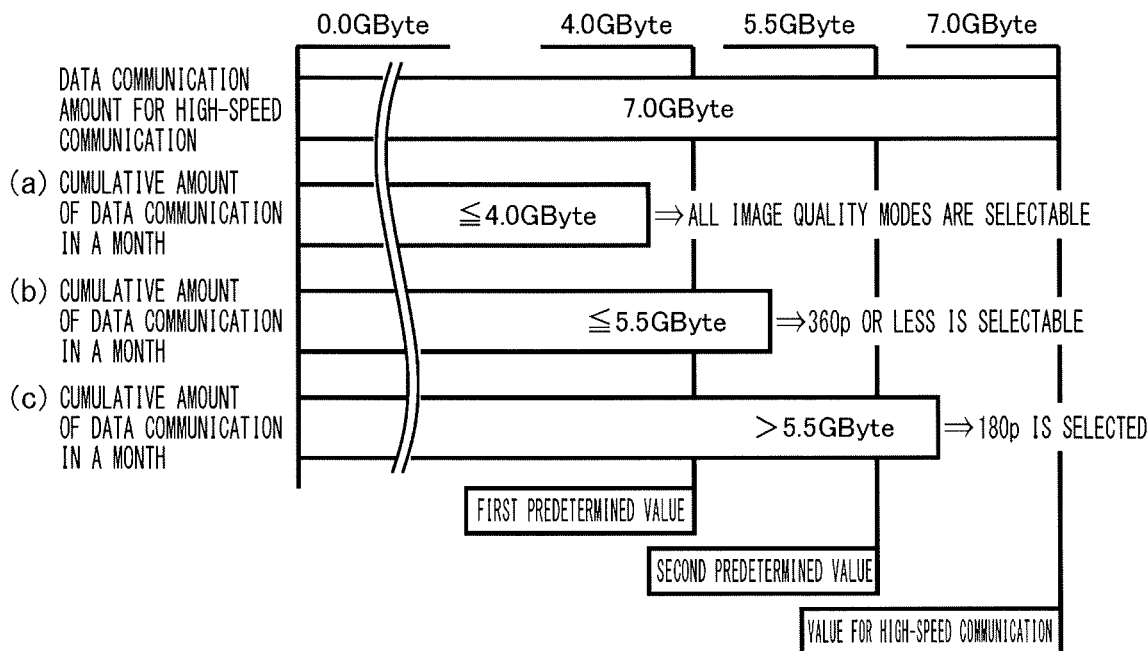
FIG. 6A is a diagram illustrating an example of control of remote viewing image quality according to a total data communication amount of the mobile information terminal.
FIG. 6B is a diagram illustrating an example of control of the remote viewing image quality according to the total data communication amount of the mobile information terminal and a period.

FIG. 6A is a schematic diagram illustrating an example of a process of controlling the remote viewing image quality according to the total data communication amount through mobile phone network communication in a predetermined period (in a month).

In the present example, two thresholds, namely, a first predetermined value (for example, 4.0 GB) and a second predetermined value (for example, 5.5 GB) are set for the total data communication amount (for example, 7.0 GB) up to which high-speed data communication is possible. The remote viewing image quality selectable by the user is controlled according to the result of comparing the data communication amount in a predetermined period (in a month) up to the time of viewing with the first predetermined value and the second predetermined value. Specifically, in S111, the data communication amount check module 1103a of the communication management execution module 1103 checks the cumulative data communication amount of the mobile information terminal 100 through mobile phone network communication in a predetermined period (in a month) up to the time of viewing (hereinafter referred to as a "particular point in time").

(a) When the cumulative data communication amount is less than or equal to the first predetermined value, the remote viewing execution module 1102 performs the control in such a way that any one of the remote viewing image qualities of the 720p, 360p, and 180p can be selected in S112. (b) When the cumulative data communication amount is more than the first predetermined value and less than or equal to the second predetermined value, the remote viewing execution module 1102 performs the control in such a way that one of the remote viewing image qualities of the 360p and 180p can be selected in S112. (c) When the cumulative data communication amount is more than the second predetermined value, the remote viewing execution module 1102 performs the control in such a way that only the remote viewing image quality of the 180p can be selected in S112.

Basically, the particular point in time is the time of viewing, and particularly, the time when the viewing is started. However, the particular point in time may not be strictly limited to the time when the viewing is started because the viewing is started after the data communication amount is subjected to comparison and the remote viewing image quality is selected. The particular point in time may be, for example, the time of execution of S111, a certain time of the day when the cumulative data communication amount before the execution of S111 is calculated, or a time of the day when the data communication amount up to the day before the execution of S111 is totaled.

Note that the above-described process of checking the cumulative data communication amount of the mobile information terminal 100 through mobile phone network communication in a predetermined period (in a month) may be performed as follows: causing the data communication amount check module 1103 to transmit identification information with which the mobile information terminal 100 can be identified to the mobile phone communication server 300; and causing the mobile phone communication server 300 to obtain a value corresponding to the cumulative data communication amount of the mobile information terminal 100. Alternatively, the process may be performed as follows: causing the basic operation execution module 1101 of the mobile information terminal 100 to operate in the background during data communication and to accumulate, in the storage unit 110 or the like, the data communication amount each time the data communication is performed through the mobile phone network communication unit 122; and causing the data communication amount check module 1103 to obtain the accumulation value, or other methods may be used.

Such a control makes it possible to reduce the likelihood of using up the data capacity within which high-speed data communication is possible due to successive selection of a higher remote viewing image quality when the remote viewing function is used and thereby making the subsequent use of service inconvenient. That is, it becomes possible to provide a mobile information terminal that provides high usability when content viewing is performed.

There may be a case where the above-described communication capacity within which high-speed data communication is possible in a predetermined period (in a month) differs among mobile phone carriers. In this case, control may be performed in such a way that the communication management execution module 1103 changes the first predetermined value and the second predetermined value depending on a mobile phone carrier to which a subscription has been made. Specifically, for example, (a) when the mobile information terminal 100 is used under the subscription to a mobile phone carrier A, the first predetermined value and the second predetermined value are set to 3.0 GB and 5.0 GB, respectively. (b) When the mobile information terminal 100 is used under the subscription to a mobile phone carrier B, the first predetermined value and the second predetermined value are set to 4.0 GB and 5.5 GB, respectively. (c) When the mobile information terminal 100 is used under the subscription to a mobile phone carrier C, the first predetermined value and the second predetermined value are set to 5.0 GB and 6.0 GB, respectively.

Note that the user may perform change control of the first predetermined value and the second predetermined value in, for example, a setting menu of the mobile information terminal 100 each time the mobile phone carrier to which the subscription has been made is changed. Alternatively, after the connection state of a subscriber identify module (SIM) card and the like (not illustrated) associated with the state of subscription to each mobile phone carrier is detected, the change control may be automatically performed according to the detected SIM card and the like. Each predetermined value used for the change control may be pre-stored in the mobile information terminal 100 as a reference table or may be obtained from the mobile phone communication server 300 or a database server (not illustrated) on a network each time the change control is performed. The change control may be performed according to each predetermined value stored in the SIM card and the like. This control may be performed by the communication management execution module 1103.

Note that when the above-described communication capacity within which high-speed data communication is possible in a predetermined period (in a month) set by the mobile phone carrier is a sufficiently large amount or the mobile phone carrier does not impose a limitation on the communication speed, it goes without saying that the first predetermined value and the second predetermined value may not be set and all of the remote viewing image qualities may be made selectable. Furthermore, the number of predetermined values is not limited to two and one or more than two predetermined values may be set.

Such a control makes it possible to reduce the likelihood of using up the data capacity within which high-speed data communication is possible due to successive selection of a higher remote viewing image quality when the remote viewing function is used and thereby making the subsequent use of service inconvenient. That is, it becomes possible to provide a mobile information terminal that provides high usability when content viewing is performed.

FIG. 6B is a schematic diagram illustrating an example, which is different from the above example, of a process of controlling the remote viewing image quality according to the total data communication amount through mobile phone network communication in a predetermined period (in a month). In this example, the data communication amount management module 1103a of the communication management execution module 1103 checks the cumulative data communication amount of the mobile information terminal 100 through mobile phone network communication up to a particular point in time in a predetermined period (in a month) while the data communication period management module 1103b of the communication management execution module 1103 checks elapsed time up to the particular point in time in the predetermined period (in a month) in S111. According to these results, the remote viewing image quality selectable by the user is controlled.

That is, as illustrated in FIG. 6B, the communication management execution module 1103 checks elapsed time up to a particular point in time in the predetermined period (in a month), and (a) from the first day to the 10th day of each month, the first predetermined value and the second predetermined value are set to 3.0 GB and 5.0 GB, respectively. (b) From the 11th day to the 20th day, the first predetermined value and the second predetermined value are set to 4.0 GB and 5.5 GB, respectively. (c) From the 21st day to the end of the month, the first predetermined value and the second predetermined value are set to 5.0 GB and 6.0 GB, respectively. Note that the control may be performed using smaller units of time for the elapsed date and time. Furthermore, the elapsed time may be set by the user from, for example, a setting menu of the mobile information terminal 100 or may be obtained from the mobile phone communication server 300 or a database server (not illustrated).

Similar to the case where only the above-described control in FIG. 6A is performed, such a control makes it possible to reduce the likelihood of using up the data capacity within which high-speed data communication is possible due to successive selection of a higher remote viewing image quality when the remote viewing function is used and thereby making the subsequent use of service inconvenient. Furthermore, the control makes it possible to distribute, in the predetermined period, the use of the data capacity within which high-speed data communication is possible. Moreover, the control makes it possible to reduce the likelihood of not using up, by the end of the predetermined period, the data capacity within which high-speed data communication is possible. Therefore, it becomes possible to efficiently use high-speed data communication according to the elapsed time in the predetermined period. That is, it becomes possible to provide a mobile information terminal that provides high usability when content viewing is performed.

FIG. 7A is a diagram illustrating an example of display format of the remote image quality selection box 141c2 displayed on the program guide screen 141c. In this example, when the control described in FIG. 6A is performed to prompt the user to select a remote viewing image quality, the display format of the remote image quality selection box 141c2 is controlled according to the result of comparing the data communication amount up to a particular point in time in a predetermined period (in a month), which has been checked by the data communication amount check module 1103a of the communication management execution module 1103, with the first predetermined value and the second predetermined value.

Specifically, the data communication amount check module 1103a of the communication management execution module 1103 checks the cumulative data communication amount of the mobile information terminal 100 through mobile phone network communication up to a particular point in time in a predetermined period (in a month). (a) When the cumulative data communication amount is less than or equal to the first predetermined value, the remote image quality selection box 141c2 is displayed in a display format as illustrated in (a) of FIG. 7A. (b) When the cumulative data communication amount is more than the first predetermined value and is less than or equal to the second predetermined value, the remote image quality selection box 141c2 is displayed in a display format as illustrated in (b) of FIG. 7A. (c) When the cumulative data communication amount is more than the second predetermined value, the remote image quality selection box 141c2 is displayed in a display format as illustrated in (c) of FIG. 7A.

In the displays in FIGS. 7A and 7B, circles at the left of remote viewing image quality values are so-called unselected radio buttons. The selection of a remote viewing image quality through a tap (click) operation on one of the radio buttons may be detected or the selection may be detected as a selection confirmed through an operation by the user after one of the radio buttons is tapped (clicked). Such a control allows the user, upon selecting a remote viewing image quality, to select only an appropriate remote viewing image quality corresponding to a data communication amount through mobile phone network communication up to a particular point in time in a predetermined period (in a month). That is, it becomes possible to provide a mobile information terminal that provides high usability when content viewing is performed.

FIG. 7B is a diagram illustrating an example, which is different from the above example, of display format of the remote image quality selection box 141c2 displayed on the program guide screen 141c. In this example, when the user is prompted to select a remote viewing image quality under control partially changed from the control described in FIG. 7A, selectable remote viewing image qualities are not limited. Furthermore, the initial selection position of the remote image quality selection box 141c2 is controlled according to the result of comparing the data communication amount up to a particular point in time in a predetermined period (in a month), which is checked by the data communication amount check module 1103a of the communication management execution module 1103, with the first predetermined value and the second predetermined value.

Specifically, the data communication amount check module 1103a of the communication management execution module 1103 checks the cumulative data communication amount of the mobile information terminal 100 through mobile phone network communication up to a particular point in time in a predetermined period (in a month). (a) When the cumulative data communication amount is less than or equal to the first predetermined value, the initial selection position is set to a remote viewing image quality of 720p among three selectable remote viewing image qualities, as illustrated in (a) of FIG. 7B. (b) When the cumulative data communication amount is more than the first predetermined value and is less than or equal to the second predetermined value, the initial selection position is set to a remote viewing image quality of 360p among three selectable remote viewing image qualities, as illustrated in (b) of FIG. 7B. (c) When the cumulative data communication amount is more than the second predetermined value, the initial selection position is set to a remote viewing image quality of 180p among three selectable remote viewing image qualities, as illustrated in (c) of FIG. 7B.

A black dot in a radio button at the left of a remote viewing image quality value in FIG. 7B indicates an initial selection position. The black dot of the initial selection position can be moved when one of the radio buttons is tapped (clicked). Additionally, the selection may be confirmed by a certain user operation, and it may be detected that the confirmed remote viewing image quality at the right of the black dot, which includes the initial selection position, is selected.

Similar to the case where the above-described control in FIG. 7A is performed, such a control allows the user, upon selecting a remote viewing image quality, to select only an appropriate remote viewing image quality corresponding to the total data communication amount through mobile phone network communication in a predetermined period (in a month). Furthermore, such a control allows the user to select any one of the remote viewing image qualities that can be selected by the remote viewing function of the mobile information terminal 100. That is, it becomes possible to provide a mobile information terminal that provides high usability when content viewing is performed.

Note that when the control described in FIG. 7B is performed and the user selects a remote viewing image quality that is higher than the remote viewing image quality of the initial selection position, a warning message or the like may be displayed on the display unit 141. Specifically, for example, when the remote image quality selection box 141c2 is displayed in the display format illustrated in (b) of FIG. 7B (in which the initial selection position is 360p) and the user selects 720p as a remote viewing image quality, a message such as "720p has been selected. Are you sure you want to perform remote viewing with this image quality?" is displayed on the display unit 141. This makes it possible to prevent the data communication capacity from being wasted due to an operation error by the user or the like by confirming the user's intention again when the user selects a high remote viewing image quality that is not recommended by the mobile information terminal 100.

Alternatively, control may be performed in such a way that the user is inhibited from selecting a remote viewing image quality and the remote viewing image quality is automatically determined according to the result of comparing the data communication amount up to a particular point in time in a predetermined period (in a month), which is checked by the data communication amount check module 1103a of the communication management execution module 1103, with the first predetermined value and the second predetermined value. In this case, S112 in FIG. 4 is not needed.

Specifically, the data communication amount check module 1103a of the communication management execution module 1103 first checks the cumulative data communication amount of the mobile information terminal 100 through mobile phone network communication up to a particular point in time in a predetermined period (in a month). (a) When the cumulative data communication amount is less than or equal to the first predetermined value, the 720p is selected as a remote viewing image quality, and, in S113 of the operation sequence in FIG. 4, the setting value corresponding to the selected remote viewing image quality is transmitted to the broadcast receiver 400. (b) When the cumulative data communication amount is more than the first predetermined value and is less than or equal to the second predetermined value, the 360p is selected as a remote viewing image quality, and, in S113 of the operation sequence in FIG. 4, the setting value corresponding to the selected remote viewing image quality is transmitted to the broadcast receiver 400. (c) When the cumulative data communication amount is more than the second predetermined value, the 180p is selected as a remote viewing image quality, and, in S113 of the operation sequence in FIG. 4, the setting value corresponding to the selected remote viewing image quality is transmitted to the broadcast receiver 400.

During remote viewing that has been started, when the cumulative data communication amount up to a particular point in time in a predetermined period (in a month) exceeds one of the predetermined values, control may be performed in such a way that the remote viewing image quality is changed in the middle of the remote viewing. When the remote viewing image quality is changed, a message may be displayed on the display unit 141 indicating that the change has been completed. Alternatively, the remote viewing image quality may be changed after displaying a message for confirming the change on the display unit 141 and detecting a certain user operation.

Similar to the case where only the above-described control in FIG. 6A is performed, such a control makes it possible to reduce the likelihood of using up the data capacity within which high-speed data communication is possible due to successive selection of a higher remote viewing image quality when the remote viewing function is used and thereby making the subsequent use of service inconvenient. Furthermore, such a control allows the user to omit selection of a remote viewing image quality. That is, it becomes possible to provide a mobile information terminal that provides high usability when content viewing is performed.

FIG. 8 is a screen display diagram illustrating a display example of a remote image quality selection box 141c3 displayed on the program guide screen 141c, which is different from the display example of the remote image quality selection box 141c2 illustrated in FIG. 5D. The remote image quality selection box 141c3 is configured to control a remote viewing image quality that can be selected by a user so as to be displayed with remaining viewable times provided when each of the remote viewing image qualities is selected.

Note that the remaining viewable time can be calculated by dividing a remaining amount of high-speed data communication by a communication band value needed for each remote viewing image quality. The remaining amount of high-speed data communication is obtained as the difference between the cumulative data communication amount of the mobile information terminal 100 through mobile phone network communication up to a particular point in time in a predetermined period (in a month), and the total data communication amount up to which high-speed communication is possible for each predetermined period (for each month). Both the cumulative amount and the total amount are checked by the data communication amount check module 1103a of the communication management execution module 1103.

The display of the remaining viewable time may be applied to the display illustrated in FIG. 7A or may be applied to the display illustrated in FIG. 7B. Such a control allows the user to check, upon selecting a remote viewing image quality, the remaining viewable time within which high-speed data communication is possible. That is, it becomes possible to provide a mobile information terminal that provides high usability when content viewing is performed.

Note that in the above description, the example has been described in which the data transmission and reception between the mobile information terminal 100 and the Internet 200 is performed by the mobile phone network communication unit 122 via the mobile phone communication server 300 and the base station 300b, and the data communication function provided by the mobile phone carrier, the mobile information terminal 100 being under the subscription thereof, has a capability to impose a limitation on communication speed. However, examples are not limited to the example described above. For example, in the case where the data transmission and reception between the mobile information terminal 100 and the Internet 200 is performed by the LAN communication unit 121 via the access point 200a, the above-described control may be applied to data communication with a members-only content distribution server (not illustrated) or the like in which the total download capacity therefrom in each predetermined period (in each month) is limited. That is, the above-described control may be applied to both cases where a data communication channel has a limitation on the total data capacity thereof and where a server itself has a limitation on the total download capacity therefrom.

Some examples have been described above, but it goes without saying that configurations realizing the control described above are not limited to these examples and various modifications are contemplated. For example, some of the components may be replaced with other components, and numeric values, messages, and the like that appear in the descriptions or figures are merely examples. Thus, the use of different values, messages, and the like does not impair the effect.

The above-described functions and the like may be implemented as hardware by, for example, designing some or all of the functions and the like for an integrated circuit. Alternatively, the functions and the like may be implemented as software by using a microprocessor unit or the like interpreting and executing an operation program that realizes each of the functions and the like. The functions and the like may be implemented by using both hardware and software.

Note that the software that controls the mobile information terminal 100 may be pre-stored in, for example, the ROM 103 and/or the storage unit 110 of the mobile information terminal 100 before product shipment. The software may be obtained from the additional application server 500 or the like on the Internet 200 via the LAN communication unit 121 or the mobile phone network communication unit 122 after product shipment. Furthermore, the software stored in, for example, a memory card or optical disc may be obtained via the extended interface 124 or the like.

REFERENCE SIGNS LIST

100 Mobile information terminal
101 Main controller
102 System bus
103 ROM
104 RAM
110 Storage unit
120 Communication processor
124 Extended interface
130 Operation unit
140 Image processor
150 Audio processor
160 Sensor
200 Internet
200a Access point
200r Router
300 Mobile phone communication server
300b Base station
400 Broadcast receiver
400a Antenna
400t Broadcasting tower
500 Additional application server

The invention claimed is:

1. A mobile information terminal communication method, comprising:
performing data transmission and reception, including video data reception of video data, to and from an outside of a mobile information terminal;
obtaining, from the outside, a total data communication amount indicating a limit capable of high-speed communication by the mobile information terminal within a predetermined period;
setting a predetermined value, which is determined based on the obtained total data communication amount and is less than the obtained total data communication amount, in accordance with a number of days elapsed from a start of the predetermined period;
obtaining a cumulative data communication amount of data which has been transmitted and received by a communication processor from the start of the predetermined period to a viewing start point of the video data;
determining an image quality for the video data in accordance with the cumulative data communication amount of data;
transmitting a setting value corresponding to the image quality to an external device storing the video data;
receiving the video data having the image quality from the external device; and
displaying the video data having the image quality on a display.

2. The mobile information terminal communication method according to claim 1, further including displaying a message including the image quality is changed.

3. The mobile information terminal communication method according to claim 2, further including displaying the message including viewable times.

4. The mobile information terminal communication method according to claim 1, further including:
obtaining program information or file information,
wherein information of the video data is included in the program information or file information.

5. The mobile information terminal communication method according to claim 1,
wherein the setting includes setting the predetermined value to be a first value when the number of days elapsed in the predetermined period is in a first range, and
setting the predetermined value to be a second value larger than the first value when the number of elapsed days is in a second range larger than the first range.

6. A mobile information terminal communication method comprising:
performing data transmission and reception, including video data reception of video data, to and from an outside of a mobile information terminal;
obtaining, from the outside, a total data communication amount indicating a limit capable of high-speed data communication by the mobile information terminal within a predetermined period;
obtaining a cumulative data communication amount of data which has been transmitted and received by the mobile information terminal from a start of the predetermined period to a viewing start point of the video data;
obtaining an elapsed amount of time from a start of the predetermined period;

selecting one of a plurality of predetermined values, each of which is determined based on the obtained total data communication amount and is less than the obtained total data communication amount, on the basis of the elapsed amount of time from the start of the predetermined period;

determining an image quality for the video data in accordance with the cumulative data communication amount of data;

transmitting a setting value corresponding to the image quality to an external device storing the video data;

receiving the video data having the image quality from the external device; and displaying the video data having the image quality on a display.

7. The mobile information terminal communication method according to claim 6, wherein the display is configured to display a message including the image quality is changed.

8. The mobile information terminal communication method according to claim 7, wherein the display is configured to display the message including viewable times.

9. The mobile information terminal communication method according to claim 6, further including:

obtaining program information or file information, wherein information of the video data is included in the program information or file information.

10. A mobile information terminal communication method comprising:

performing data transmission and reception, including video data reception of video data, to and from an outside of a mobile information terminal;

obtaining, from the outside, a total data communication amount indicating a limit capable of high-speed communication by the mobile information terminal within a predetermined period;

setting a predetermined value, which is determined based on the obtained total data communication amount and is less than the obtained total data communication amount, in accordance with a number of days elapsed from a start of the predetermined period;

displaying on a display a program guide screen where a list of a plurality of video content are selectable on the display as the video data to be received;

after the video data to be received is selected, obtaining a cumulative data communication amount of data which has been transmitted and received by the mobile information terminal from the start of the predetermined period to a viewing start point of the video data;

determining an image quality for the video data in accordance with the cumulative data communication amount of data;

transmitting a setting value corresponding to the image quality to an external device storing the video data;

receiving the video data having the image quality from the external device; and displaying the video data having the image quality on the display.

11. The mobile information terminal communication method according to claim 10, further including displaying a message including the image quality is changed.

12. The mobile information terminal communication method according to claim 11, further including displaying the message including viewable times.

13. The mobile information terminal communication method according to claim 10, wherein the setting includes setting the predetermined value to be a first value when the number of days elapsed in the predetermined period is in a first range, and setting the predetermined value to be a second value larger than the first value when the number of elapsed days is in a second range larger than the first range.

* * * * *